United States Patent
Ueda et al.

(10) Patent No.: US 9,906,628 B2
(45) Date of Patent: Feb. 27, 2018

(54) DATA RELAY DEVICE, DATA TRANSMISSION DEVICE, AND NETWORK SYSTEM USING COMMON ROUTING INFORMATION FOR PROTOCOL CONVERSION

(75) Inventors: Kiyotaka Ueda, Kyoto (JP); Toshikatsu Nakamura, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 144 days.

(21) Appl. No.: 14/374,697

(22) PCT Filed: Mar. 2, 2012

(86) PCT No.: PCT/JP2012/055399
§ 371 (c)(1), (2), (4) Date: Aug. 27, 2014

(87) PCT Pub. No.: WO2013/111350
PCT Pub. Date: Aug. 1, 2013

(65) Prior Publication Data
US 2014/0369179 A1    Dec. 18, 2014

(30) Foreign Application Priority Data
Jan. 27, 2012    (JP) .................................. 2012-015811

(51) Int. Cl.
*H04L 29/06* (2006.01)
*H04L 12/701* (2013.01)
(Continued)

(52) U.S. Cl.
CPC ........ *H04L 69/08* (2013.01); *H04L 12/40006* (2013.01); *H04L 12/4625* (2013.01);
(Continued)

(58) Field of Classification Search
None
See application file for complete search history.

(56) References Cited

U.S. PATENT DOCUMENTS 5,778,189 A * 7/1998 Kimura ................. G06F 13/387
709/236
6,272,135 B1    8/2001 Nakatsugawa
(Continued)

FOREIGN PATENT DOCUMENTS

EP    0692897    1/1996
JP    10-243012    9/1998
(Continued)

OTHER PUBLICATIONS

International Search Report, dated Mar. 27, 2012, in International Application No. PCT/JP2012/055399.

*Primary Examiner* — Peter Chau
(74) *Attorney, Agent, or Firm* — Greenblum & Bernstein, P.L.C.

(57) ABSTRACT

With respect to a routing and a gateway (protocol conversion) in a network system, frame data can simply be generated even if a source node does not understand format specifications of all protocols, communication efficiency degradation caused by an enlargement of header information can be prevented as much as possible, and dealing with a new protocol can be simplified. A source node (data transmission device) transmits "common routing information", which includes route information identifying all the nodes through which a message frame is routed from an own node to a destination node, while adding the common routing information on the message frame. Each relay node (data relay device) sequentially transfers the message frame while referring to the common routing information to perform
(Continued)

identification of a destination, generation of a header, and update of the common routing information.

5 Claims, 8 Drawing Sheets

(51) Int. Cl.
    *H04L 12/66*     (2006.01)
    *H04L 29/08*     (2006.01)
    *H04L 12/40*     (2006.01)
    *H04L 12/46*     (2006.01)

(52) U.S. Cl.
    CPC .............. *H04L 12/66* (2013.01); *H04L 45/00* (2013.01); *H04L 67/12* (2013.01); *H04L 69/18* (2013.01); *H04L 2012/4026* (2013.01)

(56) References Cited

U.S. PATENT DOCUMENTS

| | | | |
|---|---|---|---|
| 7,447,221 B2 | 11/2008 | Namihira | |
| 7,643,467 B2 * | 1/2010 | Smith | H04L 45/04 370/338 |
| 2003/0016668 A1 * | 1/2003 | Mugica | H04L 45/00 370/392 |
| 2006/0146826 A1 | 7/2006 | Namihira | |
| 2007/0064618 A1 * | 3/2007 | Garcia | H04L 43/12 370/252 |
| 2008/0310311 A1 * | 12/2008 | Flammer | H04L 45/00 370/238 |
| 2009/0046732 A1 * | 2/2009 | Pratt, Jr. | H04L 12/66 370/406 |
| 2009/0316622 A1 * | 12/2009 | Hirano | H04L 45/36 370/328 |
| 2010/0195560 A1 | 8/2010 | Nozaki et al. | |
| 2010/0195574 A1 * | 8/2010 | Richeson | G01D 4/004 370/328 |

FOREIGN PATENT DOCUMENTS

| | | |
|---|---|---|
| JP | 2004-503122 | 1/2004 |
| JP | 4330520 | 6/2009 |
| JP | 2010-178145 | 8/2010 |
| WO | 01/59966 | 8/2001 |

* cited by examiner

CPU unit: generation

CPU unit: transmission

Communication coupler unit: reception

Communication coupler unit: transmission

Slave unit: reception

Slave unit: accession

Slave unit: generation

Slave unit: transmission

Communication coupler unit: reception

Communication coupler unit: transmission

CPU unit: reception

CPU unit: accession

DATA RELAY DEVICE, DATA TRANSMISSION DEVICE, AND NETWORK SYSTEM USING COMMON ROUTING INFORMATION FOR PROTOCOL CONVERSION

TECHNICAL FIELD

The present invention relates to a technology of performing a relay between networks having different protocols.

BACKGROUND ART

In FA (Factory Automation), an industrial network system controls production facilities (such as motors, robots, and sensors). The industrial network system includes various slave devices each of which performs data collection and control of each production facility installed in a production line and a master device (PLC: Programmable Logic Controller) that centrally controls the slave devices. The industrial network system installed in a production line or a production site is connected to a host computer through an information-system network, and a system manager or an engineer can perform state monitoring or maintenance of each industrial network system with the computer.

Standards such as DeviceNet, CompoNet, and EtherCAT (registered trademark) are well known as a control-system network (field network) that connects the PLC and the slave devices. The case that instruments are directly connected to each other through an internal bus is also regarded as a network, and defined as Backplane Bus. On the other hand, standards such as EtherNet/IP are well known as the information-system network that connects the PLC and the host computer. Thus, a plurality of network or protocol standards are well known as the industrial network. Therefore, a plurality of kinds of networks having different protocols are mixed together in one network system in some cases. In such network systems, for the purpose of relay between different kinds of networks, it is necessary to arrange a data relay device (also referred to as a router, a communication coupler, or a relay) to perform a gateway (protocol conversion) or a routing.

A general gateway (protocol conversion) method in the industrial network system will be described. FIG. 1 illustrates a configuration example of the network system including the plurality of kinds of industrial networks. A topmost computer 10 and a PLC 20 are connected to each other through EtherNet/IP, and three slave devices 21, 22, and 23 are connected to the PLC 20 through Backplane Bus. The slave device 23 and a communication coupler 30 are connected to each other through EtherCAT (registered trademark), and three slave devices 31, 32, and 33 are connected to the communication coupler 30 through Backplane Bus. The slave device 33 is connected to a communication coupler 40 through DeviceNet, and three slave devices 41, 42, and 43 are connected to the communication coupler 40 through Backplane Bus.

In the configuration, in the case that the computer 10 transmits a message to the lowermost slave device 43, the message is routed through six kinds of networks in total as follows.

(1) computer 10→(EtherNet/IP)→PLC 20
(2) PLC 20→(Backplane Bus)→slave device 23
(3) slave device 23→(EtherCAT)→communication coupler 30
(4) communication coupler 30→(Backplane Bus)→slave device 33
(5) slave device 33→(DeviceNet)→communication coupler 40
(6) communication coupler 40→(Backplane Bus)→slave device 43

At this point, as illustrated in a part (1) of FIG. 9, the computer 10 produces and transmits a frame in which pieces of header information H1 to H6 of all network protocols of nodes from the computer 10 that is of a source node to the slave device 43 that is of a destination node are sequentially added to message information M. As illustrated in parts (2) to (6) of FIG. 9, the PLC 20, the slave device 23, the communication coupler 30, the slave device 33, and the communication coupler 40, which perform the relay in the network, sequentially decapsulate the received frame to be able to deal with the difference of the protocol.

Because the method can not only decapsulate the frame but also implement the gateway, advantageously a mechanism of a communication coupler that performs the relay in the network can be simplified. At the same time, the conventional method has the following problems.

First, it is necessary that the source node transmitting the message generates the pieces of header information on all the network protocols. Therefore, it is necessary to understand a high level of technical processing and format specifications of all the protocols in a frame generation function of the source node. In the case that the message transmitted from the source node receives a routing abnormality, it is necessary for a person in charge of maintenance to understand the format specifications of all the protocols in order to analyze where and which the abnormality is generated. Second, with increasing number of kinds of routed networks (encapsulated severalfold), the header information is enlarged to reduce a data area (a payload size in a packet) that can practically be used by a user. In an environment in which the networks are mixed together, a frame size is restricted according to the network having the smallest MTU (Maximum Transmission Unit). For example, for the frame size of about 500 bytes, when the six pieces of 30-byte header information need to be added as described above, about one third of the frame size, namely, 180 bytes are occupied by the header information, which leads to degradation of communication efficiency. Third, it is difficult to comply with a new protocol. Every time the new protocol emerges, it is necessary to modify the frame generation function of the destination node, and to add the function of generating the header information on the new protocol and the function of the encapsulating the header information on the new protocol. Therefore, development man-hour increases to influence a wide range (a range of the instrument or program to be modified).

For example, Patent Document 1 to Patent Document 3 disclose the gateway or routing function in a general IP network. However, the above problems cannot be solved even if the technologies disclosed in Patent Document 1 to Patent Document 3 are diverted to the industrial network.

PRIOR ART DOCUMENTS

Patent Documents

Patent Document 1: Japanese Patent No. 4330520
Patent Document 2: International Patent Publication No. 2004-503122
Patent Document 3: EP Patent Application No. 95201792

SUMMARY OF THE INVENTION

Problems to be Solved by the Invention

To solve the problem, an object of the invention is to provide a technology of being able to simply generate the frame data even if the source node does not understand the format specifications of all the protocols, of preventing the communication efficiency degradation caused by the enlargement of the header information as much as possible, and of simplifying dealing with the new protocol with respect to the routing function and the gateway (protocol conversion) in the network system.

Means for Solving the Problem

The invention is summarized as follows. A source node (data transmission device) transmits "common routing information" which includes route information identifying all nodes through which a message frame is routed from an own node to a destination node, while adding the common routing information on the message frame, and each relay node (data relay device) sequentially transfers the message frame while referring to the common routing information to perform identification of a destination, generation of a header, and update of the common routing information.

Specifically, according to one aspect of the invention, a data transmission device connected to a network system constructed with a plurality of kinds of networks having different protocols to transmit a message to a destination node, the data transmission device includes: a storage section in which network configuration information is stored, all networks and nodes constituting the network system being defined in the network configuration information; a common routing information generation section configured to refer to the network configuration information to generate common routing information including route information identifying all the nodes through which the message is routed from an own node to the destination node; a frame generation section configured to generate a frame including a data structure in which a header portion pursuant to the protocol of the network between the own node and an initial relay node is added to a data portion including the common routing information and the message transmitted to the destination node; and a transmission section configured to transmit the frame to the relay node.

According to another aspect of the invention, a data relay device configured to relay a message transmitted from a source node from a first network to a second network in a middle of a passage through which the message is transferred to a destination node in a network system constructed with a plurality of kinds of networks having different protocols, the data relay device includes: a first port to which the first network is connected; a second port to which the second network is connected; and a relay section configured to convert a first frame received from a first node on the first network through the first port into a data format pursuant to the protocol of the second network, and to transmit a post-conversion second frame to a second node on the second network through the second port. In the data relay device, the first frame includes a data structure in which a first header portion pursuant to the protocol of the first network is added to a data portion including common routing information and the message, the common routing information includes route information identifying all nodes through which the message is routed from the source node to the destination node. The relay section recognizes that a next destination is the second node on the second network by referring to the common routing information acquired from the data portion of the first frame, generates a second header portion pursuant to the protocol of the second network, and generates the second frame by adding the generated second header portion to the data portion including the common routing information and the message.

According to the configuration, it is not necessary for the source node to generate all the pieces of header information, or it is not necessary for the source node to understand the format specifications of all the protocols, but it is only necessary for the source node to identify the routed nodes from the source node to the destination node.

According to the configuration, it is not necessary to perform the multiple encapsulation unlike the conventional technology, but it is only necessary to add the common routing information on the data portion of the frame. The data size of the common routing information (however, depending on the format) can considerably be reduced compared with the case that the pieces of header information are arrayed the number of relay times, so that the data area used by the user can sufficiently be ensured to enhance the practical communication efficiency. The effect becomes pronounced with increasing number of relay times.

Additionally, as to the work necessary for the source node to comply with the new protocol, it is only necessary to decide a common routing information description rule how to describe the route information on the node conducting communication pursuant to the new protocol in the common routing information, and to adjust the frame generation function of the source node to the description rule.

In the data transmission device, preferably the transmission section transmits the frame to the relay node after replacing information identifying the relay node that is of a next destination in the route information included in the common routing information with information identifying the own node that is of a return address. In the data relay device, preferably the relay section adds the common routing information on the data portion of the second frame after replacing information identifying the second node that is of a next destination in the route information included in the common routing information with information identifying an own node that is of a return address.

According to the configuration, each node performs the replacement of the route information, whereby a return passage used to transmit a response message from the destination node to the source node is automatically constructed in the common routing information when the frame reaches the destination node. Accordingly, the use of the common routing information can facilitate the transfer of the response message.

Preferably the common routing information includes an area where error information is recorded, and when a failure in transmission to the second node is generated, after recording the error information in the common routing information, the relay section generates a frame in which the common routing information is added on the data portion to transmit the frame to the first node.

According to the configuration, in the case that an abnormality is generated during the transfer of the message, where the abnormality is generated in the passage can easily specified by referring to the error information of the common routing information.

Preferably the route information included in the common routing information is constructed with information identifying a kind of a network of each routed node and a network address of the node. Thus, the data size of the common routing information can be reduced as much as possible by restricting the route information to the required minimum information.

Preferably the plurality of kinds of networks are an industrial network. The advantageous effect of the invention becomes pronounced because an industrial network has the small Maximum Transmission Unit (MTU) of the frame size.

The invention can be identified as the data relay device or data transmission device including at least a part of the above sections, identified as a network system including the data transmission device (source node), the destination node, and one or a plurality of data relay devices (relay nodes), or identified as a data relay method or data transmission method including at least a part of the above pieces of processing. The invention can also be identified as a program causing the computer to perform at least a part of the above pieces of processing, or identified as a computer-readable storage medium in which the program is recorded. The pieces of processing and the sections can freely be combined as long as technical inconsistency is generated.

Effect of the Invention

According to the invention, with respect to the routing function and the gateway (protocol conversion) in the network system, the frame data can simply be generated even if the source node does not understand the format specifications of all the protocols, the communication efficiency degradation caused by the enlargement of the header information can be prevented as much as possible, and dealing with the new protocol can be simplified.

MODE FOR CARRYING OUT THE INVENTION

An exemplary embodiment of the invention will be described below with reference to the drawings. In the following embodiment, the invention is applied to an industrial network in an FA field by way of example. However, the invention is not limited to the industrial network. In addition to the industrial network, the invention can be applied to any network such as a general OA network as long as a plurality of kinds of networks having different protocols are mixed together in a network system. However, the special-field network such as the industrial network, the advantageous effect of the invention becomes pronounced because of a small Maximum Transmission Unit (MTU) of a transmittable frame size. Therefore, the invention can preferably be applied to the special-field network such as the industrial network.

(System Configuration)

Figure 1:
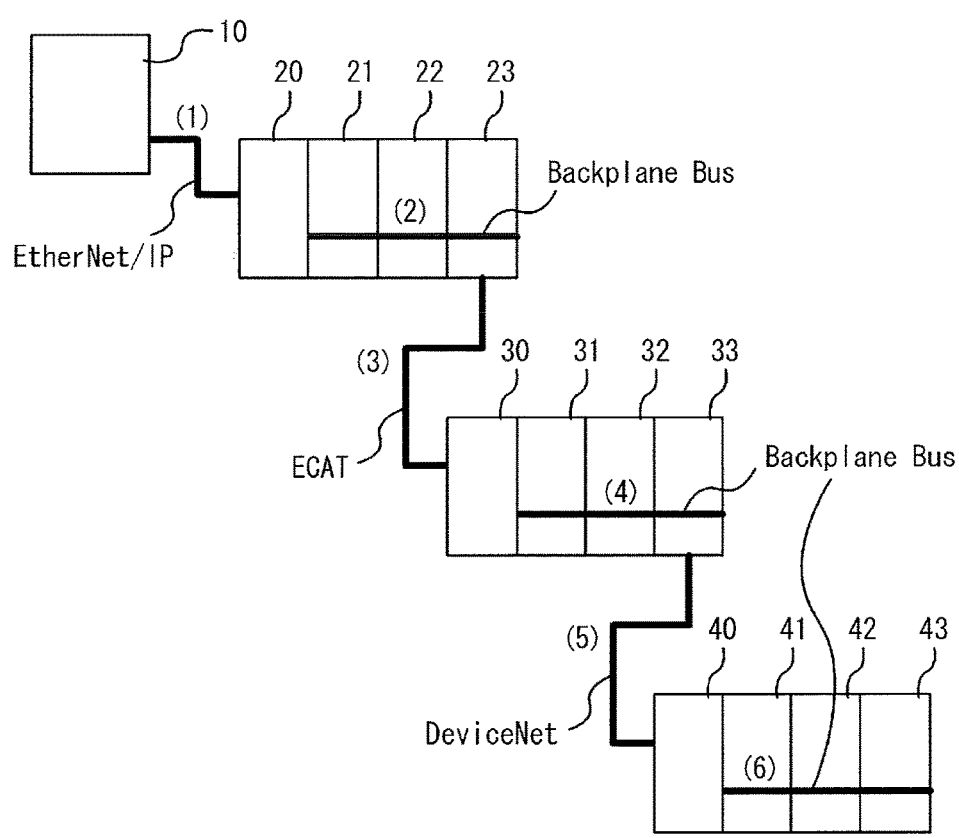
FIG. 1 is a view illustrating a configuration example of an industrial network system.

A configuration example of an industrial network system will be described with reference to FIG. 1. FIG. 1 illustrates a configuration example of a network system including the plurality of kinds of industrial networks. A topmost computer 10 and a PLC 20 are connected to each other through EtherNet/IP, and three slave devices 21, 22, and 23 are connected to the PLC 20 through Backplane Bus. The slave device 23 and a communication coupler 30 are connected to each other through EtherCAT (registered trademark), and three slave devices 31, 32, and 33 are connected to the communication coupler 30 through Backplane Bus. The slave device 33 is connected to a communication coupler 40 through DeviceNet, and three slave devices 41, 42, and 43 are connected to the communication coupler 40 through Backplane Bus.

The slave device is one that controls various production facilities (such as motors, robots, and sensors) used in a production line of a factory and collects data. Examples of the slave devices include a motor unit, a counter unit, an image unit, a communication unit, and an I/O unit. The communication coupler is a relay that relays different types of networks. For example, the topmost computer 10 is used when a system manager monitors a state of the industrial network system or when an engineer performs maintenance of each instrument constituting the industrial network system. A general-purpose personal computer including a display device and an input device can be used as the computer 10.

It is considered that, in the configuration in FIG. 1, the computer 10 transmits a message to the lowermost slave device 43. That is, the computer 10 constitutes a "source node", the slave device 43 constitutes a "destination node", and each of the PLC 20, the slave device 23, the communication coupler 30, the slave device 33, and the communication coupler 40, which relay the message between the different kinds of networks, constitutes a "relay node". In this case, the computer 10 acts as the data transmission device of the invention, and each of the PLC 20, the slave device 23, the communication coupler 30, the slave device 33, and the communication coupler 40 acts as the data relay device of the invention. The source node (data transmission device), the relay node (data relay device), and the destination node are not limited to the above examples. For example, in the case that the PLC 20 transmits the message to the slave device 31, the PLC 20 acts as the source node (data transmission device), and the slave device 23 and the communication coupler 30 act as the relay node (data relay device).

(Data Transmission Device)

Figure 2:
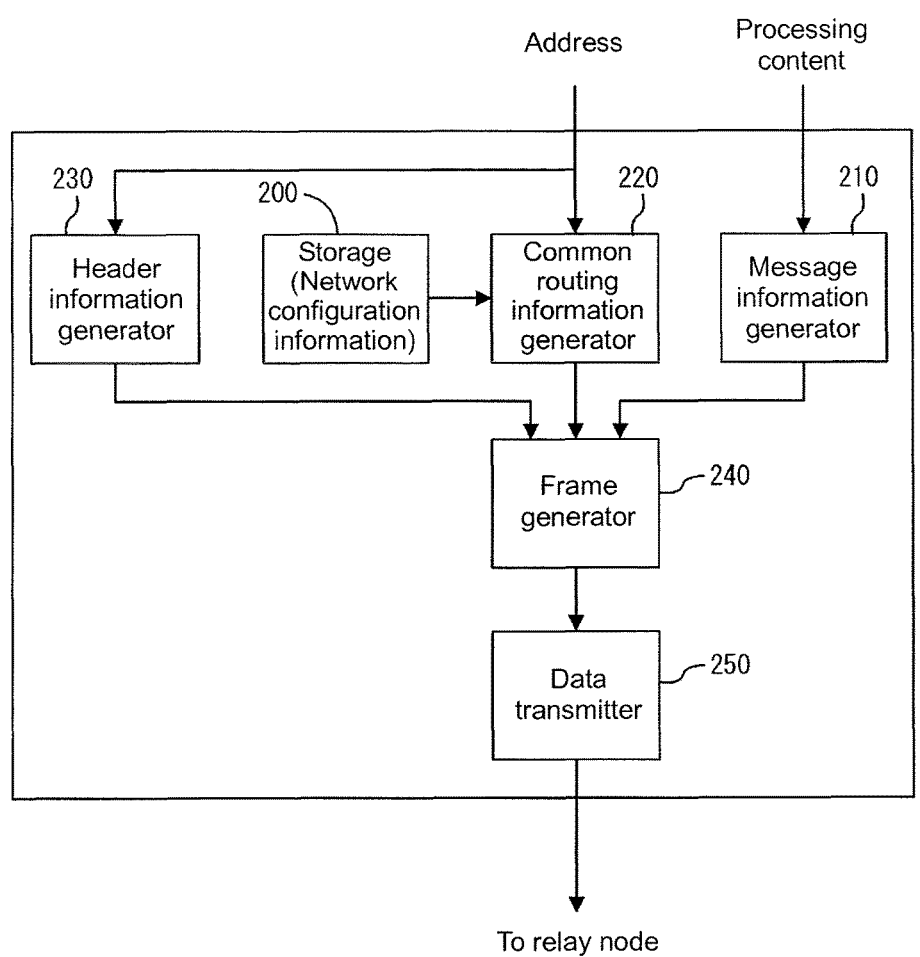
FIG. 2 is a block diagram schematically illustrating a functional configuration of a data transmission device.

FIG. 2 is a block diagram illustrating a functional configuration of the data transmission device. The data transmission device includes a storage 200 in which network configuration information is stored, a message information generator 210 that generates message information, a common routing information generator 220 that generates common routing information, a header information generator 230 that generates header information, a frame generator 240 that generates a message frame, and a data transmitter 250 that transmits data, as functions thereof. A CPU of the data transmission device executes a program stored in a storage device (such as a ROM, a flash memory, and a magnetic disk) of the data transmission device, thereby implementing these functions.

The network configuration information in which all the networks and nodes constituting the network system in FIG. 1 are defined is stored in the storage 200. For example, profile information (such as a manufacturer name, an instrument name, and a revision number) on the instrument (such as a PLC, a slave device, and a communication coupler) of each node, a kind of network (network protocol) to which each node is connected, and a network address of each node are described in the network configuration information. The network configuration information can be produced by a user during design or construction of the network system, or dynamically be produced from information collected from the network system by the data transmission device or another computer.

Figure 3:
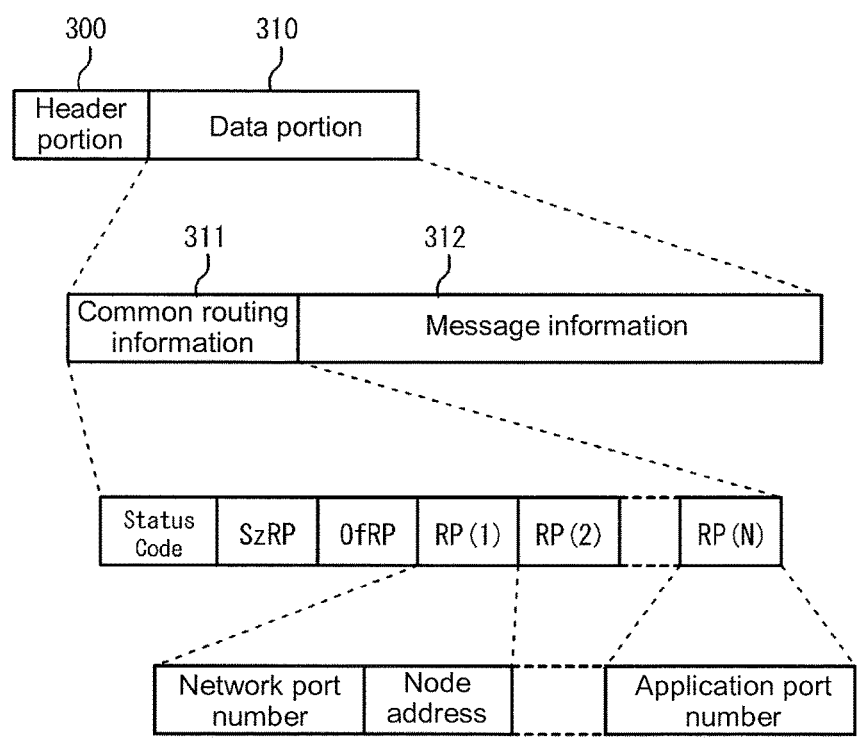
FIG. 3 illustrates an example of a frame format.

Operation, which is performed when the data transmission device generates and transmits the message frame, will be described with reference to FIGS. 2 and 3. FIG. 3 illustrates an example of a format of a frame used in the network system of the embodiment.

The frame is a data transmission unit, and is also called a packet. As illustrated in FIG. 3, one frame includes a header portion 300 and a data portion 310. The header portion 300 is an area where information on data transmission is described. For example, the header portion 300 includes the kind of the network protocol, the network address of the source node, and the network address of the destination node. A specific format of the header portion 300 is decided in each network protocol. The data portion 310 is an area where any information can be described.

A Maximum Transmission Unit (MTU) of a data size of the frame is previously decided in each network protocol. For example, DeviceNet and CompoNet have the MTU of 542 bytes, and EtherCAT (registered trademark) has the MTU of 1500 bytes. In EtherNet/IP, although there is no limitation according to the specifications, sometimes the MTU of several hundred bytes to several thousand bytes is provided in each vender that produces a compatible instrument. In the case that the plurality of kinds of industrial networks coexist as illustrated in FIG. 1, it is necessary to set the frame size according to the network having the smallest MTU.

In the data transmission device, message information 312 generated by the message information generator 210 and common routing information 311 generated by the common routing information generator 220 are described in the data portion 310. The message information 312 is one that is provided to the destination node by the source node, and the message information 312 can include any information. By way of example, a command and a parameter can be transmitted as the message information 312 to an application included in the device of the destination node.

The common routing information 311 is data in which a passage from the source node to the destination node is described. In the example of FIG. 3, the common routing information 311 includes "StatusCode", "SzRP", "OfRP", and "RP" fields.

The "StatusCode" field is an area where error information is recorded when an abnormality is generated during message transfer. The "RP" field is route information identifying the node through which the frame is routed from the source node to the destination node. The "RP" field is provided in each routed node. The "SzRP" field is information expressing the total size of pieces of route information RP on all the nodes. The "OfRP" field is information expressing a read position of the route information RP, and an initial value of the "OfRP" field is set to 0 (indicating the position of a head RP(1)).

In the embodiment,
"network port number, node address" of first node+"network port number, node address" of second node+ . . . +"network port number, node address" of destination node+"application port number" is described in the order closer to the source node
is used as the route information RP.

The network port number is information identifying the kind of the network to which each node is connected. For example, the network port number is one that is uniquely assigned in each kind of the network such that EtherNet/IP is set to "0", such that DeviceNet is set to "1", and such that USB is set to "2". The node address is information identifying each node connected to the network. The specification of the node address depends on the network to which the node is connected. For example, the IP address is used in EtherNet/IP. The application port number added to the end of the route information RP is one assigned in each application (server processing) included in the device of the destination node. The application port number is used to identify the application processing the message information. In the form of the route information RP, because the information on each node can be described in several bytes, the data size of the common routing information can be highly compact. For example, in the case that the message reaches the destination node through the five relay nodes as illustrated in FIG. 1, the data size of the common routing information fits in about 40 to about 50 bytes.

The operation of the data transmission device will be described with reference to FIG. 2. When the destination node and a processing content are designated, the common routing information generator 220 refers to the network configuration information of the storage 200 to acquire information on the relay node through which the frame is routed from an own node to the destination node, and generates the common routing information. The message information generator 210 generates message information provided to the destination node according to the designated processing content. The header information generator 230 acquires the information on the destination node from the network configuration information of the storage 200 to generate the header portion. The frame generator 240 generates the frame data by adding the header portion to the data portion that is generated from the common routing information and the message information. Then the data transmitter 250 transmits the frame data to the initial relay node.

The data transmitter 250 does not directly transmit the generated frame data, but transmits the frame data after replacing the information (that is, head route information) indicating the initial relay node in the route information of the common routing information with information on the own node that is of a return address. Because the replacing processing is similar to that of the data relay device, the detailed replacing processing is described later with reference to FIG. 5.

Figure 4:
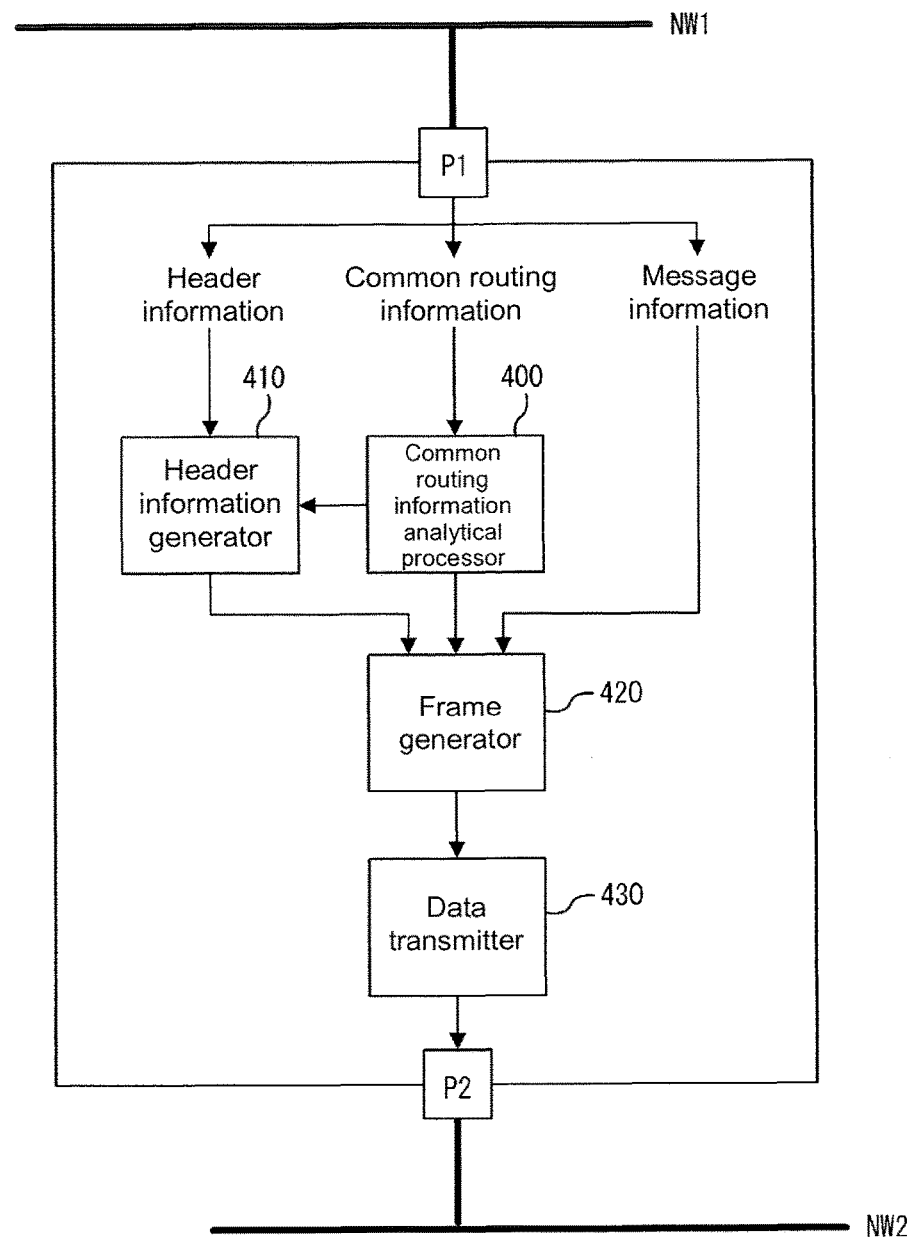
FIG. 4 is a block diagram schematically illustrating a functional configuration of a data relay device.

(Data Relay Device)
FIG. 4 is a block diagram schematically illustrating a functional configuration of the data relay device. The data relay device is one that performs the relay between different kinds of networks NW1 and NW2 having different protocols. The data relay device has the function of converting the frame received from the network NW1 through a port P1 into the data format pursuant to the protocol of the network NW2, and then transmitting the post-conversion frame to the next destination node on the network NW2 through a port P2. The data relay device includes a common routing information analytical processor 400 that analyzes and updates the common routing information, a header information generator 410 that generates the header information for the network NW2, a frame generator 420, and a data transmitter 430, as functions thereof. The CPU of the data relay device executes the program stored in the storage device (such as the ROM, the flash memory, and the magnetic disk) of the data relay device, thereby implementing these functions.

Operation of each unit of the data relay device will be described with reference to a flowchart in FIG. 5.

When the frame is received from the network NW1, the header information, the common routing information, and the message information, which are included in the frame, are delivered to the header information generator 410, the common routing information analytical processor 400, and the frame generator 420, respectively (Step S500). The common routing information analytical processor 400 reads the data at the position designated by the "OfRP" field of the common routing information, and checks the port number (Step S501). The flow is diverted to Step S503 when the port number is a value indicating the network port, and the flow is diverted to Step S509 when the port number is a value indicating the application port (Step S502).

In Step S503, the common routing information analytical processor 400 reads the data (that is, the node address) subsequent to the port number from the common routing information. The port number and node address, which are read in Steps S501 and S503, are delivered as the information indicating the next destination to the header information generator 410. The common routing information analytical processor 400 deletes the pieces of information read in Steps S501 and S503 from the common routing information (Step S504). Instead the common routing information analytical processor 400 adds the port number and node address of the own node that is of the destination to the common routing information (Step S505). Then the common routing information analytical processor 400 changes the "OfRP" field of the common routing information to the next read position, and delivers the changed common routing information to the frame generator 420 (Step S506). When receiving the information indicating the next destination from the common routing information analytical processor 400, the header information generator 410 generates the header information based on the information indicating the next destination (Step S507). The frame generator 420 generates the frame data from the common routing information, the message information, and the header information, and the data transmitter 430 transmits the frame data to the node of the next destination (Step S508).

On the other hand, when the port number read in Step S501 is the value indicating the application port, the common routing information analytical processor 400 deletes the port number from the common routing information (Step S509), and the common routing information analytical processor 400 delivers the message information to the application designated by the port number, and causes the application to perform processing (Step S510).

Figure 5:
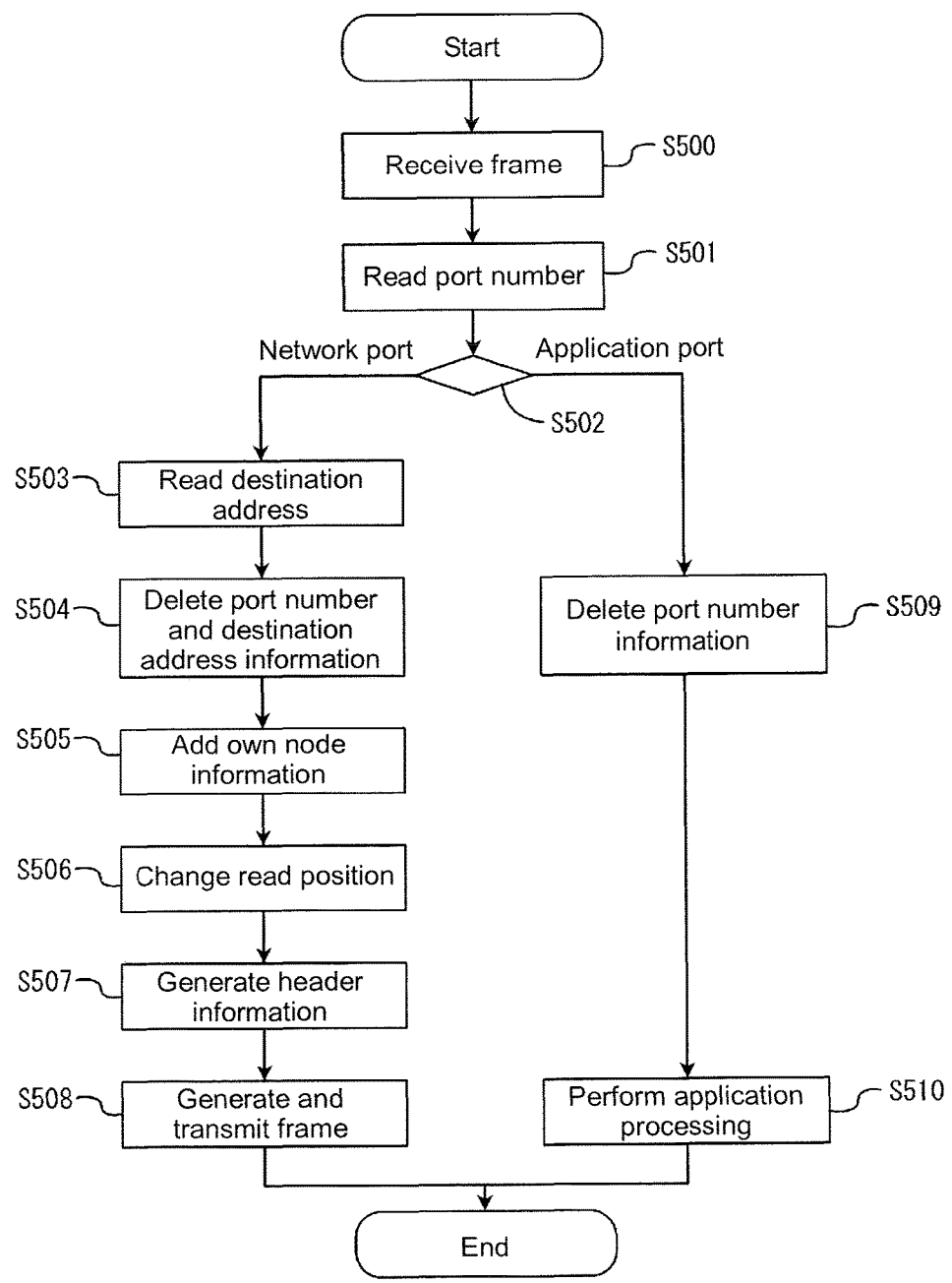
FIG. 5 is a flowchart illustrating operation of the data relay device.

The pieces of processing in FIG. 5 are performed by the relay node and the destination node, whereby the message frame transmitted from the source node is transferred to the application of the destination node. The pieces of processing in Steps S504, S505, and S509 correspond to processing of rewriting the common routing information into return route information. Each node sequentially rewrites the route information, whereby a return passage used to transmit a response message from the destination node to the source node is automatically constructed in the common routing information when the frame reaches the destination node. Accordingly, the use of the common routing information can transfer the response message by the processing completely identical to that in FIG. 5.

EXAMPLES

Figure 6:
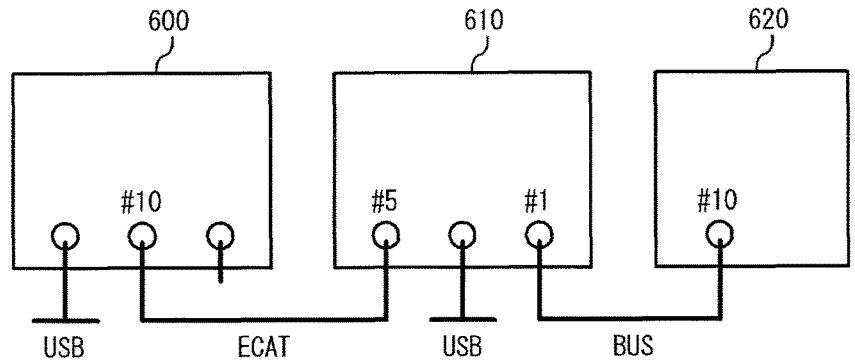
FIG. 6 is a view illustrating a configuration example of a network system in Example.
Figure 7:
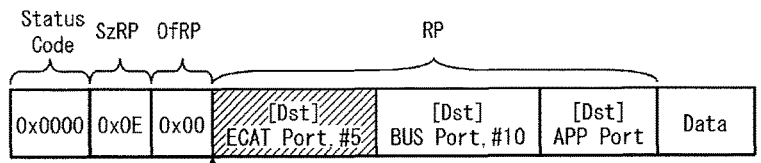
FIG. 7 is a view illustrating a transition of common routing information in each node when a CPU unit transmits a message frame.
Figure 7:
Figure 7:
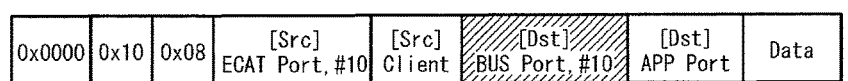
Figure 7:
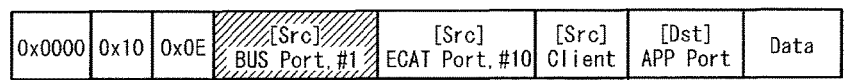
Figure 7:
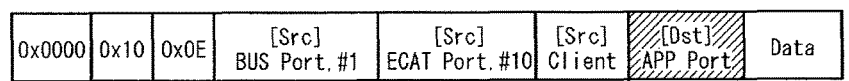
Figure 7:
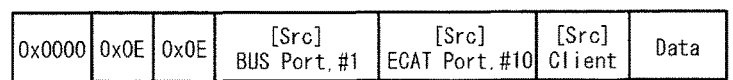
Figure 8:
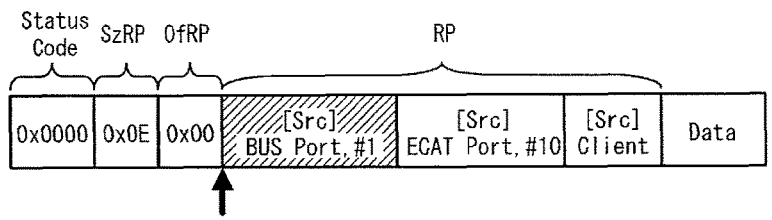
FIG. 8 is a view illustrating a transition of the common routing information in each node when a slave unit transmits a response message frame.
Figure 8:
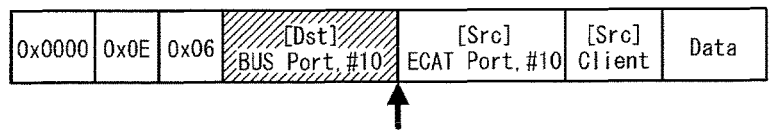
Figure 8:
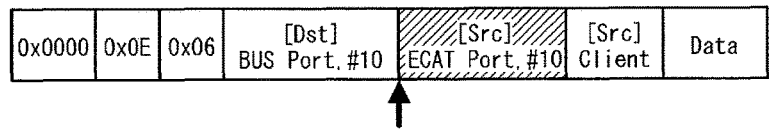
Figure 8:
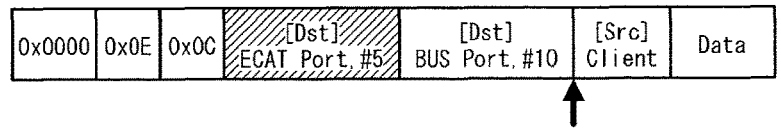
Figure 8:
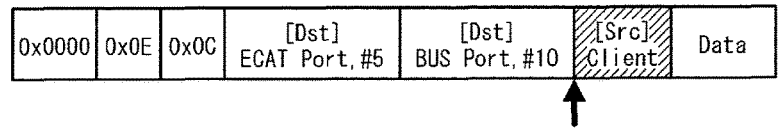
Figure 8:
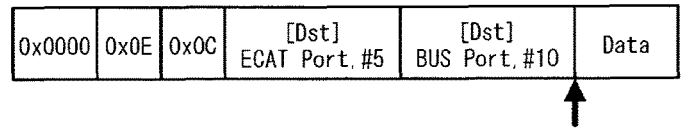
Figure 9:
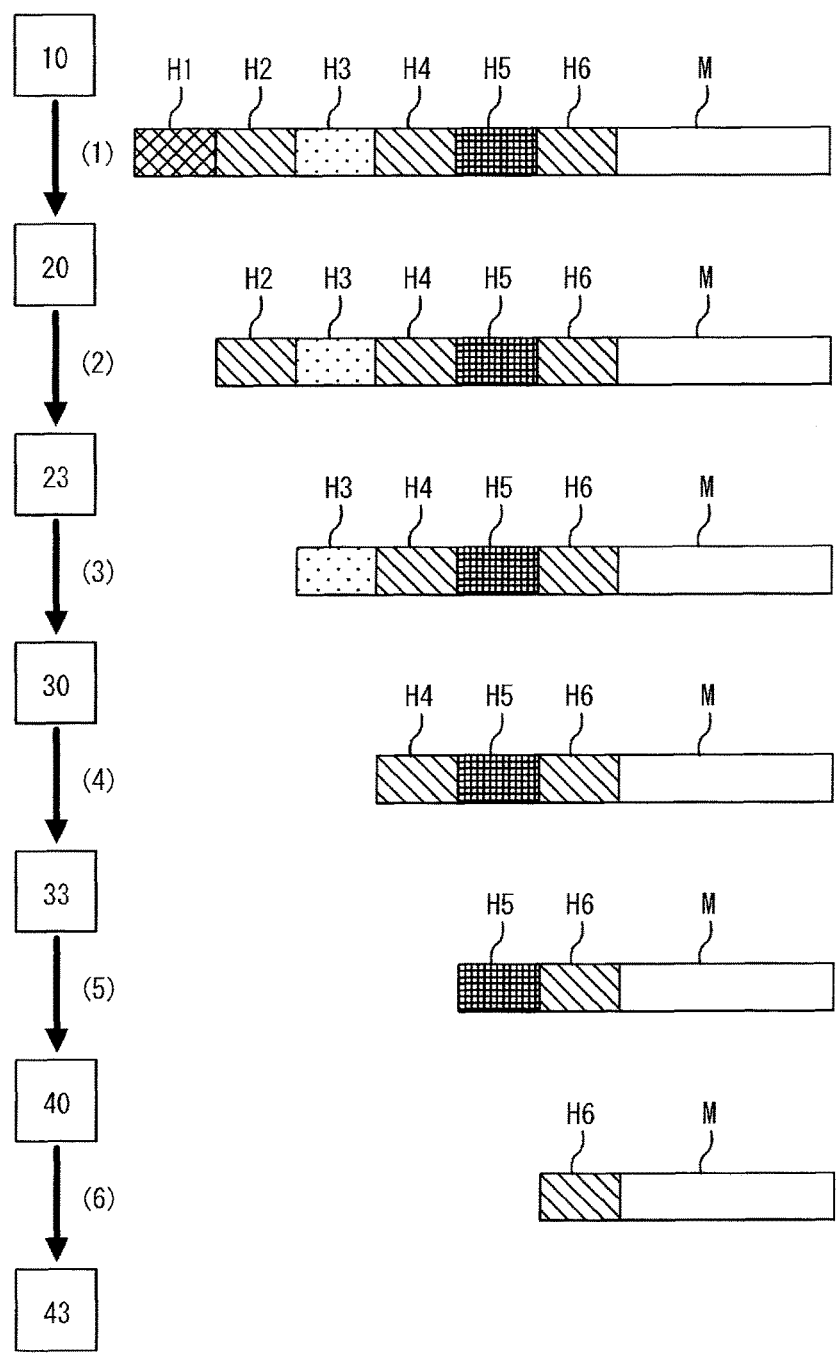
FIG. 9 is a view illustrating conventional techniques of a gateway (protocol conversion) and a routing.

FIGS. 6 to 8 illustrate specific examples of the gateway (protocol conversion) and routing of the embodiment.

FIG. 6 illustrates a configuration example of the network system, and the network system includes a CPU unit 600 that is of the source node (data transmission device), a communication coupler unit 610 that is of the relay node (data relay device), and a slave unit 620 that is of the destination node. The CPU unit 600 and the communication coupler unit 610 are connected to each other through EtherCAT (registered trademark), and the node addresses thereof are set to "10" and "5". The communication coupler unit 610 and the slave unit 620 are connected to each other through a bus, and the node addresses are set to "1" and "10".

FIG. 7 illustrates a transition of the common routing information in each node when the CPU unit 600 transmits the message frame. In FIG. 7, "Dst" indicates information on an outward route from the source node to the destination node, and "Src" indicates information on a return route from the destination node to the source node.

In the frame initially generated by the CPU unit 600, "ECAT port, 5"+"bus port, 10"+"application port" is described in the route information, and a read position OfRP is set to "0x00". When reading the head route information "ECAT port, 5", the data transmitter of the CPU unit 600 deletes the route information "ECAT port, 5", instead adds "ECAT port, 10"+"client port" to the head of the route information, updates the read position OfRP to "0x08", and then transmits the frame to the communication coupler unit 610. When receiving the frame, the communication coupler unit 610 reads the route information "bus port,10" indicated by "0x08", deletes the route information "bus port,10", instead adds the "bus port,1" to the head of the route information, updates the read position OfRP to "0x0E", and then transmits the frame to the slave unit 620. When receiving the frame, the slave unit 620 reads the route information "application port" indicated by "0x0E", and deletes the route information "application port". The slave unit 620 performs the application processing designated by the "application port".

FIG. 8 illustrates a transition of the common routing information in each node when the slave unit 620 transmits a response message frame. The slave unit 620 generates a response message frame using directly the common routing information acquired by the previous processing. The response message frame differs from the last frame in FIG. 7 in that the read position OfRP is reset to "0x00" and that the content of the message information is replaced with the response message. When reading the head route information "bus port, 1", the slave unit 620 deletes the route information "bus port, 1", instead adds "bus port, 10" to the head of the route information, updates the read position OfRP to "0x06", and then transmits the frame to the communication coupler unit 610. Then the response message reaches the CPU unit 600 by a repetition of the processing similar to that of the outward of each node.

In the case that a failure to transmit the frame is generated in a certain node, the node writes a predetermined error code in Status Code of the common routing information, and sends back the frame to the source node using return route information (Src) described in return common routing information. A return procedure is similar to that in FIG. 8. The CPU unit 600 that is of the source node checks the value of Status Code of the received frame, which allows the CPU unit 600 to simply recognize where and which the error is generated.

Advantage of Embodiment

According to the configuration of the embodiment, it is not necessary for the data transmission device (source node) to generate all the pieces of header information or to understand all the protocol formats, but it is only necessary for the data transmission device to identify the routed nodes from the source node to the destination node. Therefore, the function of the data transmission device can be simplified to reduce the development man-hour.

According to the above configuration, it is not necessary to perform the multiple encapsulation unlike the conventional technology, but it is only necessary to add the common routing information on the data portion of the frame. The data size of the common routing information can considerably be reduced compared with the case that the pieces of header information are arrayed the number of relay times, so that the data area used by the user can sufficiently be ensured to enhance the practical communication efficiency. The effect becomes pronounced with increasing number of relay times.

According to the above configuration, as to the work necessary for the data transmission device (source node) to comply with the new protocol, it is only necessary to decide a common routing information description rule how to describe the route information on the node conducting communication pursuant to the new protocol in the common routing information, and to adjust the function of each node to the description rule. For example, when the description rule is provided in the format of a setting file while hard-coding of the description rule is not performed, it is not necessary to correct the program of each node. Therefore, there is the little development man-hour for dealing with the new protocol.

DESCRIPTION OF SYMBOLS

10: computer
20: PLC
21, 22, 23, 31, 32, 33, 41, 42, 43: slave device
30, 40: communication coupler
200: storage
210: message information generator
220: common routing information generator
230: header information generator
240: frame generator
250: data transmitter
300: header portion
310: data portion
311: common routing information
312: message information
400: common routing information analytical processor
410: header information generator
420: frame generator
430: data transmitter
600: CPU unit
610: communication coupler unit
620: slave unit
H1-H6: header information
M: message information
NW1, NW2: network
P1, P2: port

The invention claimed is:
1. A data transmission device connected to a network system constructed with a plurality of kinds of networks having different protocols to transmit a message to a destination node, the data transmission device comprising:
a storage in which network configuration information is stored, all networks and nodes constituting the network system being defined in the network configuration information;
at least one central processing unit having an executable program that when executed performs functions, including functions of
a common routing information generator configured to refer to the network configuration information to generate common routing information comprising route information identifying all nodes through which the message is routed from an own node to the destination node; and
a frame generator configured to generate a frame comprising a data structure in which a header portion pursuant to a protocol of a network between the own node and an initial relay node is added to a data portion comprising the common routing information and the message to be transmitted to the destination node; and
a transmitter configured to transmit the frame to the initial relay node after replacing information identifying the initial relay node that is of a next destination in the route information comprised in the common routing information with information identifying the own node that is of a return address.

2. The data transmission device according to claim 1, wherein the generated common routing information comprising route information is constructed with information identifying a kind of the network to which the initial relay node is connected and information identifying a network address of the initial relay node.

3. The data transmission device according to claim 1, wherein the plurality of kinds of networks include an industrial network.

4. A network system including a plurality of kinds of networks having different protocols, the network system comprising:
a source node configured to transmit a message;
a destination node that is of an address of the message transmitted from the source node; and
one or a plurality of relay nodes configured to relay the message between the networks having the different protocols in a middle of a passage through which the message is transmitted from the source node to the destination node,
wherein the source node is a data transmission device connected to the network system constructed with a plurality of kinds of networks having different protocols to transmit the message to the destination node, the data transmission device comprising:
a storage in which network configuration information is stored, all networks and nodes constituting the network system being defined in the network configuration information;
at least one central processing unit having an executable program that when executed performs functions, including functions of
a common routing information generator configured to refer to the network configuration information to generate common routing information comprising route information identifying all nodes through which the message is routed from an own node to the destination node;

a frame generator configured to generate a frame comprising a data structure in which a header portion pursuant to a protocol of a network between the own node and an initial relay node is added to a data portion comprising the common routing information and the message to be transmitted to the destination node; and a transmitter configured to transmit the frame to the initial relay node after replacing information identifying the initial relay node that is of a next destination in the route information comprised in the common routing information with information identifying the own node that is of a return address, and the initial relay node includes
- a first port to which a first network is connected;
- a second port to which a second network is connected; and
- a relay, including a central processing unit having an executable program that causes the relay to execute functions, the functions being configured to convert a first frame received from a first node on the first network through the first port into a data format pursuant to a protocol of the second network, and to transmit a post-conversion second frame to a second node on the second network through the second port, wherein the first frame comprises a data structure in which a first header portion pursuant to a protocol of the first network is added to a data portion comprising common routing information and the message, the common routing information in the data structure of the first frame comprises route information identifying all nodes through which the message is routed from the source node to the destination node, and the central processing unit of the relay
recognizes that a next destination is the second node on the second network by referring to the common routing information acquired from the data portion of the first frame,
generates a second header portion pursuant to the protocol of the second network, and
replaces information identifying the second node that is of a next destination in the route information comprised in the common routing information in the data structure of the first frame with information identifying an own node that is of a return address, and generates the post-conversion second frame by adding the generated second header portion to the data portion of the first frame, the data portion of the first frame comprising changed routing information including replacement information and the message.

5. A non-transitory computer-readable storage medium includes a program configured to cause a data transmission device, which is connected to a network system constructed with a plurality of kinds of networks having different protocols to transmit a message to a destination node, to act as:

a storage in which network configuration information is stored, all networks and nodes constituting the network system being defined in the network configuration information;

a common routing information generator configured to refer to the network configuration information to generate common routing information comprising route information identifying all nodes through which the message is routed from an own node to the destination node;

a frame generator configured to generate a frame comprising a data structure in which a header portion pursuant to a protocol of a network between the own node and an initial relay node is added to a data portion comprising the common routing information and the message to be transmitted to the destination node; and a transmitter configured to replace information identifying the initial relay node that is of a next destination in the route information comprised in the common routing information with information identifying the own node that is of a return address, and to transmit the frame to the initial relay node.

* * * * *